(12) United States Patent (10) Patent No.: US 8,708,124 B2
Morizumi et al. (45) Date of Patent: Apr. 29, 2014

(54) PARKING LOCK APPARATUS FOR TRANSMISSION

(75) Inventors: Kenji Morizumi, Wako (JP); Shinji Fujimoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 316 days.

(21) Appl. No.: 13/147,524

(22) PCT Filed: Feb. 1, 2010

(86) PCT No.: PCT/JP2010/051345
§ 371 (c)(1),
(2), (4) Date: Aug. 2, 2011

(87) PCT Pub. No.: WO2010/100987
PCT Pub. Date: Sep. 10, 2010

(65) Prior Publication Data
US 2011/0284340 A1 Nov. 24, 2011

(30) Foreign Application Priority Data
Mar. 4, 2009 (JP) .................................. 2009-050511

(51) Int. Cl.
*F16H 63/34* (2006.01)
*B60T 1/06* (2006.01)

(52) U.S. Cl.
USPC ...................................... 192/219.5; 74/411.5

(58) Field of Classification Search
CPC .................................................. F16H 63/3425
USPC ...................................................... 192/219.5
See application file for complete search history.

(56) References Cited

U.S. PATENT DOCUMENTS 3,601,231 A * 8/1971 Kolacz et al. .................... 188/69
3,987,879 A * 10/1976 Longshore et al. ......... 192/219.5
(Continued)

FOREIGN PATENT DOCUMENTS

CN 2856600 Y 1/2007
DE 10021176 A1 11/2001
(Continued)

OTHER PUBLICATIONS

International Search Report for PCT/JP2010/051345, mailing date of Mar. 23, 2010.
(Continued)

*Primary Examiner* — Richard M. Lorence
(74) *Attorney, Agent, or Firm* — Westerman, Hattori, Daniels & Adrian, LLP

(57) ABSTRACT

A parking lock apparatus for a transmission including a meshing type clutch is provided in which when a parking lock is operated by engaging a parking pawl (43) with a parking gear (41) provided on a gear shaft of a transmission, since a parking rod (51) for operating the parking pawl (43) is provided on a shift rod (44) connected to and operated by an actuator (46) in order to establish a reverse gear position on the transmission, it is possible to establish the reverse gear position with a shift fork (48) by moving the shift rod (44) in one direction from the neutral position, and to carry out the operation of the parking lock automatically without requiring a special actuator by moving the shift rod (44) in another direction from the neutral position, thereby reducing the size and cost of the transmission by enabling the number of components, including the number of actuators (46), to be cut.

2 Claims, 9 Drawing Sheets

(56) References Cited

U.S. PATENT DOCUMENTS

| | | | |
|---|---|---|---|
| 4,177,886 A * | 12/1979 | Hiraiwa et al. | 192/219.5 |
| 4,493,403 A * | 1/1985 | Takano et al. | 192/219.5 |
| 5,799,536 A | 9/1998 | Janiszewski et al. | |
| 6,588,294 B1 | 7/2003 | Rogg | |
| 7,707,904 B2 | 5/2010 | Kimura et al. | |
| 2007/0272511 A1 * | 11/2007 | Saitoh | 192/219.5 |
| 2008/0242467 A1 | 10/2008 | Matsushita | |

FOREIGN PATENT DOCUMENTS

| | | |
|---|---|---|
| JP | 59-23753 A | 2/1984 |
| JP | 62-183162 U | 11/1987 |
| JP | 2003-506639 A | 2/2003 |
| JP | 2006-105221 A | 4/2006 |
| JP | 2006-322489 A | 11/2006 |
| JP | 2007-147057 A | 6/2007 |
| JP | 2008-151210 A | 7/2008 |
| JP | 2008-249095 A | 10/2008 |
| WO | 01/09534 A1 | 2/2001 |

OTHER PUBLICATIONS

Supplementary European Search Report dated Jun. 13, 2012, issued in corresponding European Patent Application No. EP 10 74 8584.(4 pages).

Chinese Office Action dated Jul. 1, 2013, issued in corresponding Chinese Patent Application No. 201080006767.5 (5 pages).

* cited by examiner

NEUTRAL POSITION

REVERSE POSITION

PARKING LOCK POSITION

PARKING LOCK APPARATUS FOR TRANSMISSION

TECHNICAL FIELD

The present invention relates to a parking lock apparatus for a transmission in which a meshing type clutch provided on a gear shaft of a transmission is operated by a gearshift member that is connected to and operated by an actuator so as to establish a predetermined gear position.

BACKGROUND ART

An arrangement in which a parking pawl, which operates a parking lock by engaging with a parking gear provided on a gear shaft always connected to a vehicle wheel of a transmission, is driven by an actuator formed from an electric motor, is known from Patent Document 1 below.

Furthermore, a shift-by-wire type transmission in which a manual valve for gear shift control is operated by a control rod, which is operated by an electric motor, a parking pawl of a parking lock mechanism is operable by the control rod, and when the shift range becomes a P range the parking pawl is engaged with a parking gear and the parking lock is automatically operated, is known from Patent Document 2 below.
Patent Document 1: Japanese Patent Application Laid-open No. 2006-322489
Patent Document 2: Japanese Patent Application Laid-open No. 2008-151210

DISCLOSURE OF THE INVENTION

Problems to be Solved by the Invention

Since a shift-by-wire type transmission that converts a driver's gear shift operation into an electrical signal and carries out shift change by operating a meshing type clutch such as a synchromesh mechanism provided in a transmission by means of an actuator operated based on the electrical signal does not include a manual valve for controlling the operation of a hydraulic clutch for shift change, it is impossible to operate a parking lock mechanism by utilizing an actuator for operating a manual valve.

The present invention has been accomplished in light of the above-mentioned circumstances, and it is an object thereof to enable the operation of a parking lock of a transmission that includes a meshing type clutch to be carried out automatically without requiring a special actuator.

Means for Solving the Problems

In order to attain the above object, according to a first aspect of the present invention, there is provided a parking lock apparatus for a transmission in which a meshing type clutch provided on a gear shaft of a transmission is operated by a gearshift member that is connected to and operated by an actuator so as to establish a predetermined gear position, characterized in that the parking lock apparatus comprises a parking gear provided on the shaft that is operable in association with a drive shaft when a vehicle is stopped, a parking pawl that can engage with the parking gear, and a parking pawl drive member that is provided in the gearshift member and operates the parking pawl.

Further, according to a second aspect of the present invention, in addition to the first aspect, if the gearshift member is operated in one direction from a neutral position the predetermined gear position is established, and if the gearshift member is operated in another direction from the neutral position the parking pawl engages with the parking gear.

A reverse idle shaft 15 of an embodiment corresponds to the gear shaft or the shaft of the present invention, a third synchronizing device 40 of the embodiment corresponds to the meshing type clutch of the present invention, a shift rod 44 of the embodiment corresponds to the gearshift member of the present invention, and a parking rod 51 of the embodiment corresponds to the parking pawl drive member of the present invention.

Effects of the Invention

In accordance with the first aspect of the present invention, when, at the time the vehicle is stopped, the parking lock is operated by engaging the parking pawl with the parking gear provided on the shaft operable in association with the drive shaft, since the parking pawl drive member for operating the parking pawl is provided on the gearshift member connected to and operated by the actuator in order to establish a predetermined gear position by operating the meshing type clutch provided on the gear shaft of the transmission, it becomes possible to carry out both establishment of the predetermined gear position and operation of the parking lock using the common gearshift member, and it is possible to reduce the size of the transmission and cut the cost by enabling the number of components, including the number of actuators, to be cut.

Furthermore, in accordance with the second aspect of the present invention, since the predetermined gear position is established by operating the gearshift member in one direction from the neutral position, and the parking pawl is engaged with the parking gear by operating the gearshift member in another direction from the neutral position, it becomes possible to impart to one gearshift member both a gear shift function and a parking lock function, thereby further reducing the number of components and contributing to a reduction in the size and weight of the transmission.

EXPLANATION OF REFERENCE NUMERALS AND SYMBOLS

15 Reverse idle shaft (gear shaft, shaft)
23 Drive shaft

40 Third synchronizing device (meshing type clutch)
41 Parking gear
43 Parking pawl
44 Shift rod (gearshift member)
46 Actuator
51 Parking rod (parking pawl drive member)
M Transmission

BEST MODE FOR CARRYING OUT THE
INVENTION

A mode for carrying out the present invention is explained below by reference to FIG. 1 to FIG. 10.

First Embodiment

Figure 1:
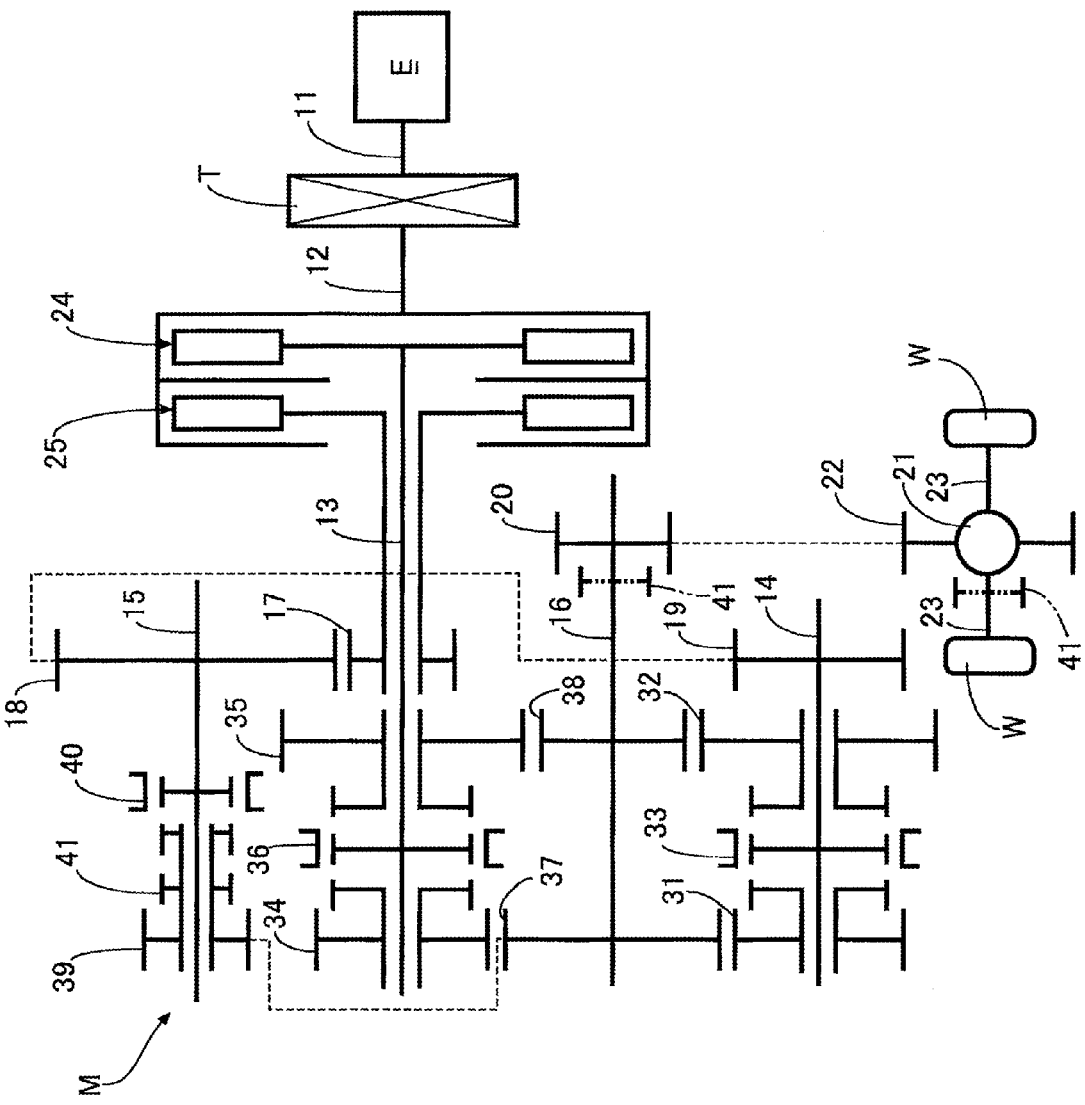
FIG. 1 is a skeleton diagram of a transmission (first embodiment).

As shown in FIG. 1, a twin clutch type transmission M having four forward speeds includes a main input shaft 12 coaxially connected to a crankshaft 11 of an engine E via a torque converter T, a first auxiliary input shaft 13 disposed coaxially with the main input shaft 12, a second auxiliary input shaft 14 disposed in parallel to the main input shaft 12, a reverse idle shaft 15 disposed in parallel to the main input shaft 12, and an output shaft 16 disposed in parallel to the main input shaft 12.

An idle drive gear 17 relatively rotatably supported on the first auxiliary input shaft 13 meshes with an idle gear 18 fixedly provided on the reverse idle shaft 15, and the idle gear 18 meshes with an idle driven gear 19 fixedly provided on the second auxiliary input shaft 14. Furthermore, a final drive gear 20 fixedly provided on the output shaft 16 meshes with a final driven gear 22 of a differential gear 21, and the differential gear 21 is connected to left and right wheels W and W via left and right drive shafts 23 and 23.

When a first clutch 24, which is a multiple plate wet clutch, is engaged, the driving force of the main input shaft 12 is transmitted directly to the first auxiliary input shaft 13. When a second clutch 25, which is a multiple plate wet clutch, is engaged, the driving force of the main input shaft 12 is transmitted to the second auxiliary input shaft 14 via the idle drive gear 17, the idle gear 18, and the idle driven gear 19. Therefore, selectively engaging the integrated first and second clutches 24 and 25 enables rotation of the main input shaft 12 to be transmitted selectively and in the same direction to the first and second auxiliary input shafts 13 and 14. In this process, the ratio of the rotational speeds of the first and second auxiliary input shafts 13 and 14 can be freely set according to the numbers of teeth of the idle drive gear 17, the idle gear 18, and the idle driven gear 19.

Mutually independently and relatively rotatably supported on the second auxiliary input shaft 14 are a first speed drive gear 31 and a third speed drive gear 32, the first speed drive gear 31 and the third speed drive gear 32 being capable of being connected selectively to the second auxiliary input shaft 14 via a first synchronizing device 33. On the other hand, mutually independently and relatively rotatably supported on the first auxiliary input shaft 13 are a second speed drive gear 34 and a fourth speed drive gear 35, the second speed drive gear 34 and the fourth speed drive gear 35 being capable of being connected selectively to the first auxiliary input shaft 13 via a second synchronizing device 36.

Furthermore, fixedly provided on the output shaft 16 are a first speed—second speed—reverse driven gear 37 and a third speed—fourth speed driven gear 38, the first speed—second speed—reverse driven gear 37 meshing with the first speed drive gear 31, the second speed drive gear 34, and a reverse idle gear 39 relatively rotatably supported on the reverse idle shaft 15, and the third speed—fourth speed driven gear 38 meshing with the third speed drive gear 32 and the fourth speed drive gear 35.

The reverse idle gear 39 relatively rotatably supported on the reverse idle shaft 15 can be connected to the reverse idle shaft 15 via a third synchronizing device 40. A parking gear 41 is formed integrally with the reverse idle gear 39.

Since the transmission M of the present embodiment is a type of so-called automatic/manual transmission, the first to third synchronizing devices 33, 36, and 40 are operated by an electronically controlled actuator, which is not illustrated.

Establishment of first speed to fourth speed gear positions and a reverse gear position of the transmission M having the above-mentioned arrangement is now explained.

Figure 2:
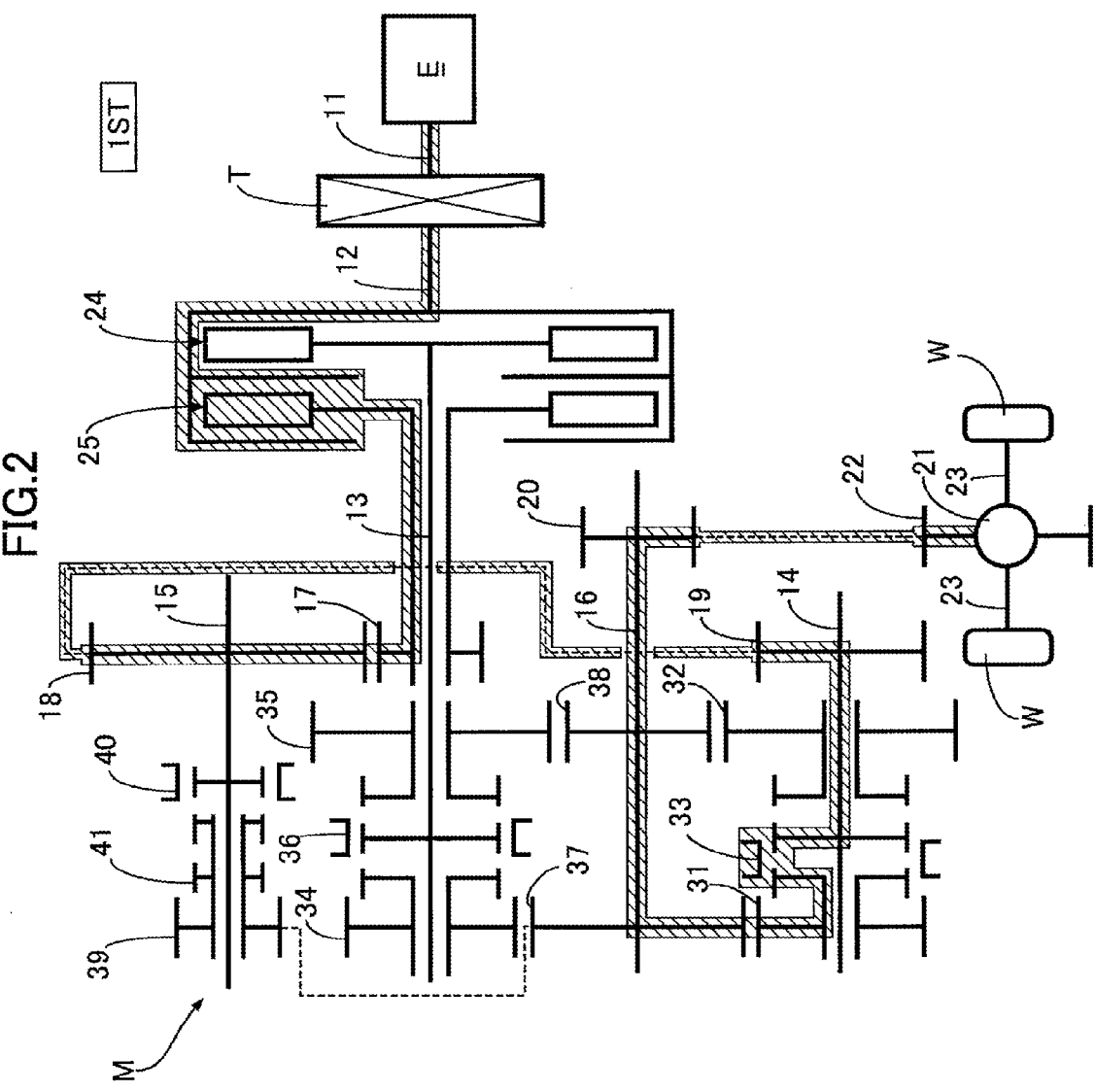
FIG. 2 is a diagram showing a state in which a first speed gear position is established (first embodiment).

As shown in FIG. 2, when establishing the first speed gear position, in a state in which the first speed drive gear 31 is connected to the second auxiliary input shaft 14 by the first synchronizing device 33, the second clutch 25 is engaged so as to connect the main input shaft 12 to the second auxiliary input shaft 14. In this state, the driving force of the engine E is transmitted to the wheels W and W via the path: torque converter T→main input shaft 12→second clutch 25→idle drive gear 17→idle gear 18→idle driven gear 19→second auxiliary input shaft 14→first synchronizing device 33→first speed drive gear 31→first speed—second speed→reverse driven gear 37→output shaft 16→final drive gear 20→final driven gear 22→differential gear 21→drive shafts 23 and 23.

Figure 3:
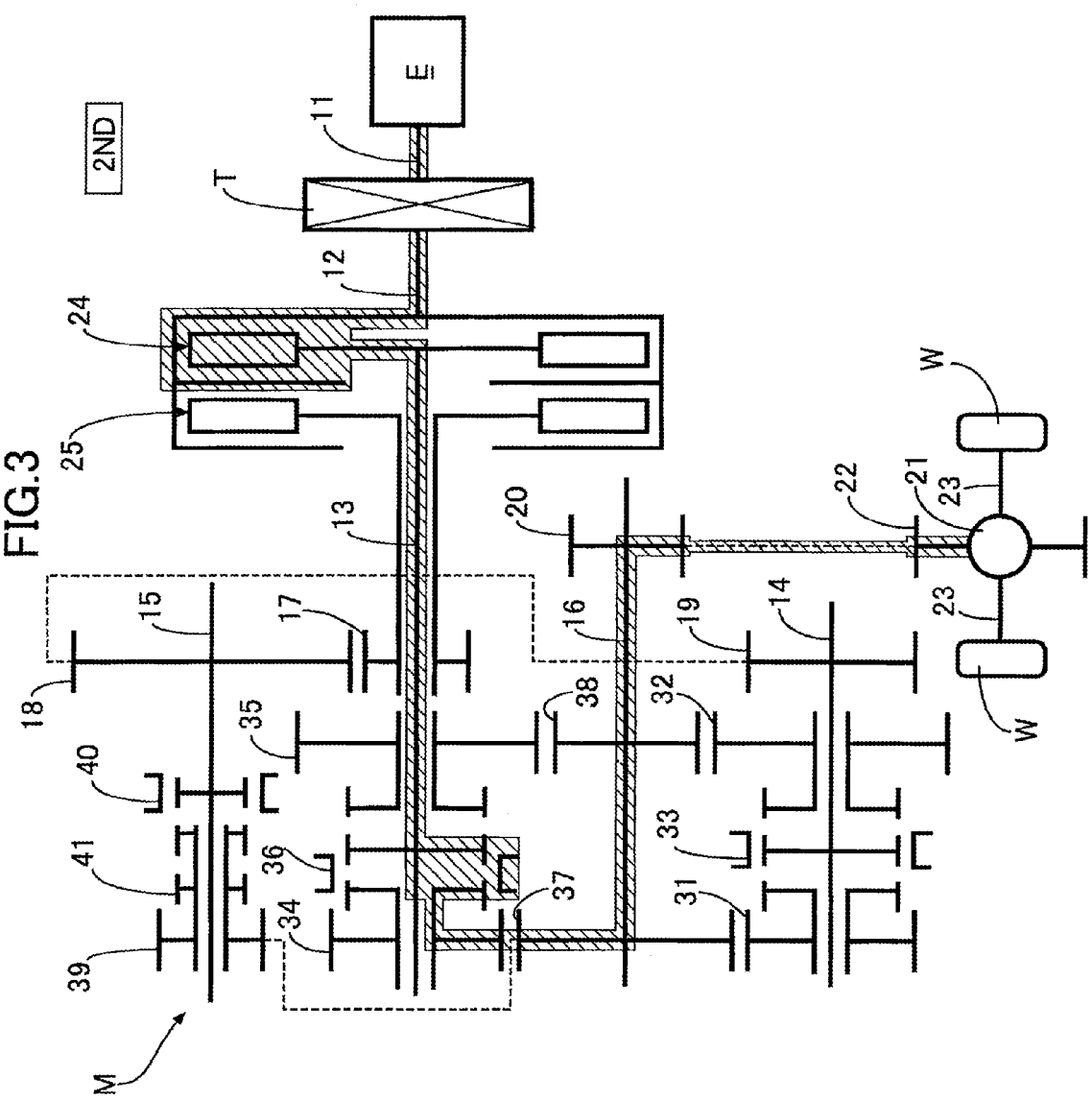
FIG. 3 is a diagram showing a state in which a second speed gear position is established (first embodiment).

As shown in FIG. 3, when establishing the second speed gear position, in a state in which the second speed drive gear 34 is connected to the first auxiliary input shaft 13 by the second synchronizing device 36, the first clutch 24 is engaged so as to connect the main input shaft 12 to the first auxiliary input shaft 13. In this state, the driving force of the engine E is transmitted to the wheels W and W via the path: torque converter T→main input shaft 12→first clutch 24→first auxiliary input shaft 13→second synchronizing device 36→second speed drive gear 34→first speed—second speed—reverse driven gear 37→output shaft 16→final drive gear 20→final driven gear 22→differential gear 21→drive shafts 23 and 23.

Figure 4:
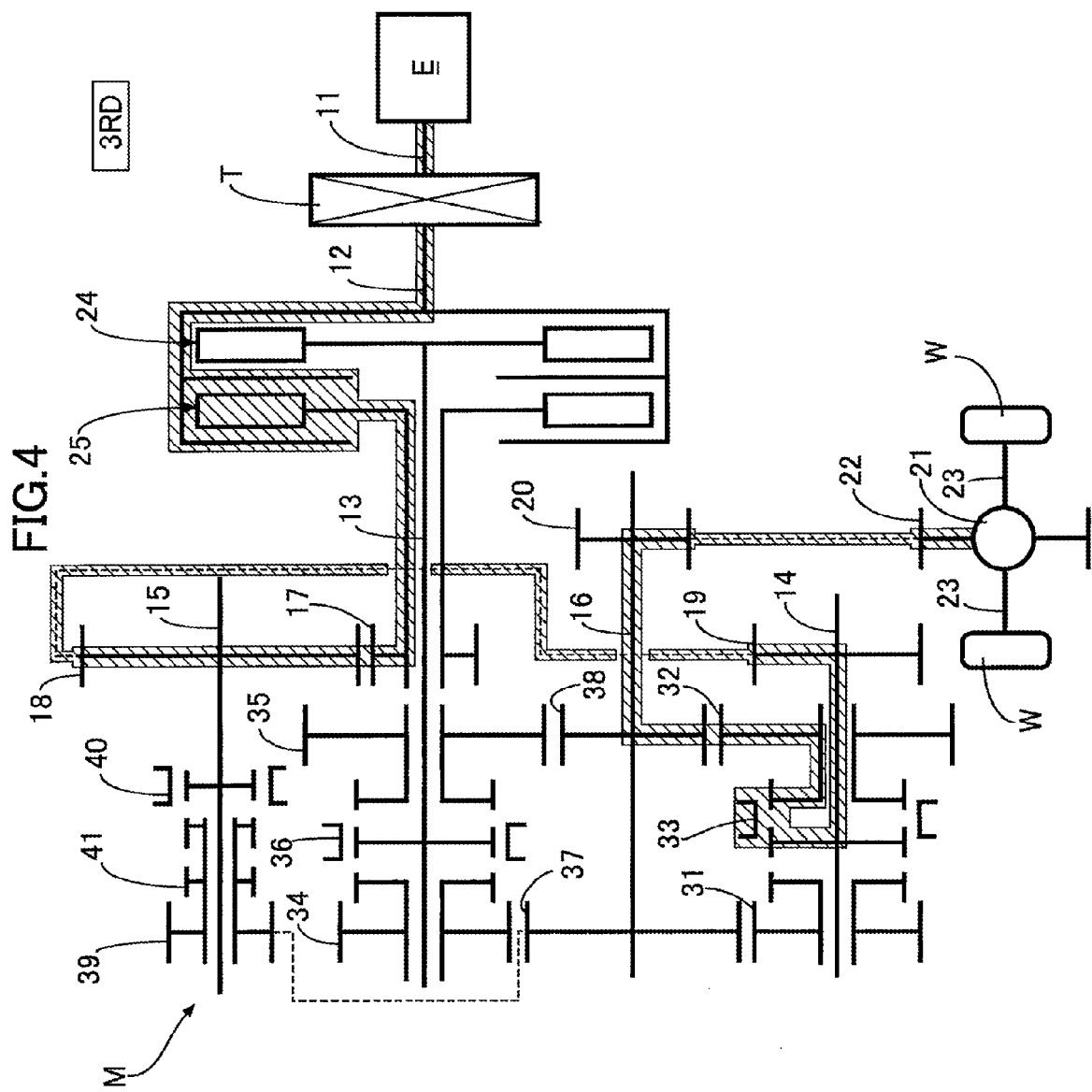
FIG. 4 is a diagram showing a state in which a third speed gear position is established (first embodiment).

As shown in FIG. 4, when establishing the third speed gear position, in a state in which the third speed drive gear 32 is connected to the second auxiliary input shaft 14 by the first synchronizing device 33, the second clutch 25 is engaged so as to connect the main input shaft 12 to the second auxiliary input shaft 14. In this state, the driving force of the engine E is transmitted to the wheels W and W via the path: torque converter T→main input shaft 12→second clutch 25→idle drive gear 17→idle gear 18→idle driven gear 19→second auxiliary input shaft 14→first synchronizing device 33→third speed drive gear 32→third speed—fourth speed driven gear 38→output shaft 16→final drive gear 20→final driven gear 22→differential gear 21→drive shafts 23 and 23.

Figure 5:
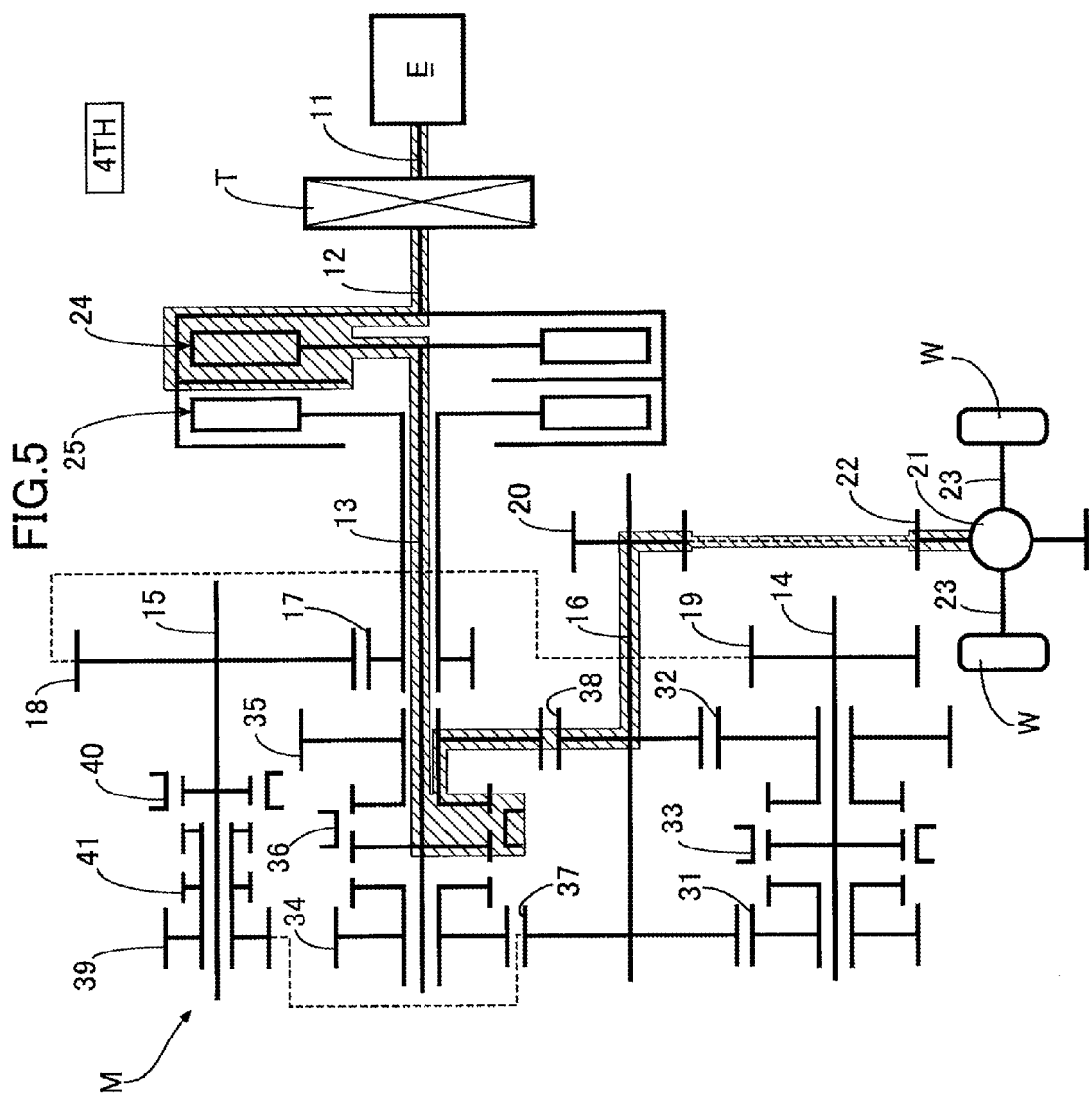
FIG. 5 is a diagram showing a state in which a fourth speed gear position is established (first embodiment).

As shown in FIG. 5, when establishing the fourth speed gear position, in a state in which the fourth speed drive gear 35 is connected to the first auxiliary input shaft 13 by the second synchronizing device 36, the first clutch 24 is engaged so as to connect the main input shaft 12 to the first auxiliary input shaft 13. In this state, the driving force of the engine E is transmitted to the wheels W and W via the path: torque converter T→main input shaft 12→first clutch 24→first auxiliary input shaft 13→second synchronizing device 36→fourth speed drive gear 35→third speed—fourth speed driven gear 38→output shaft 16→final drive gear 20→final driven gear 22→differential gear 21→drive shafts 23 and 23.

Figure 6:
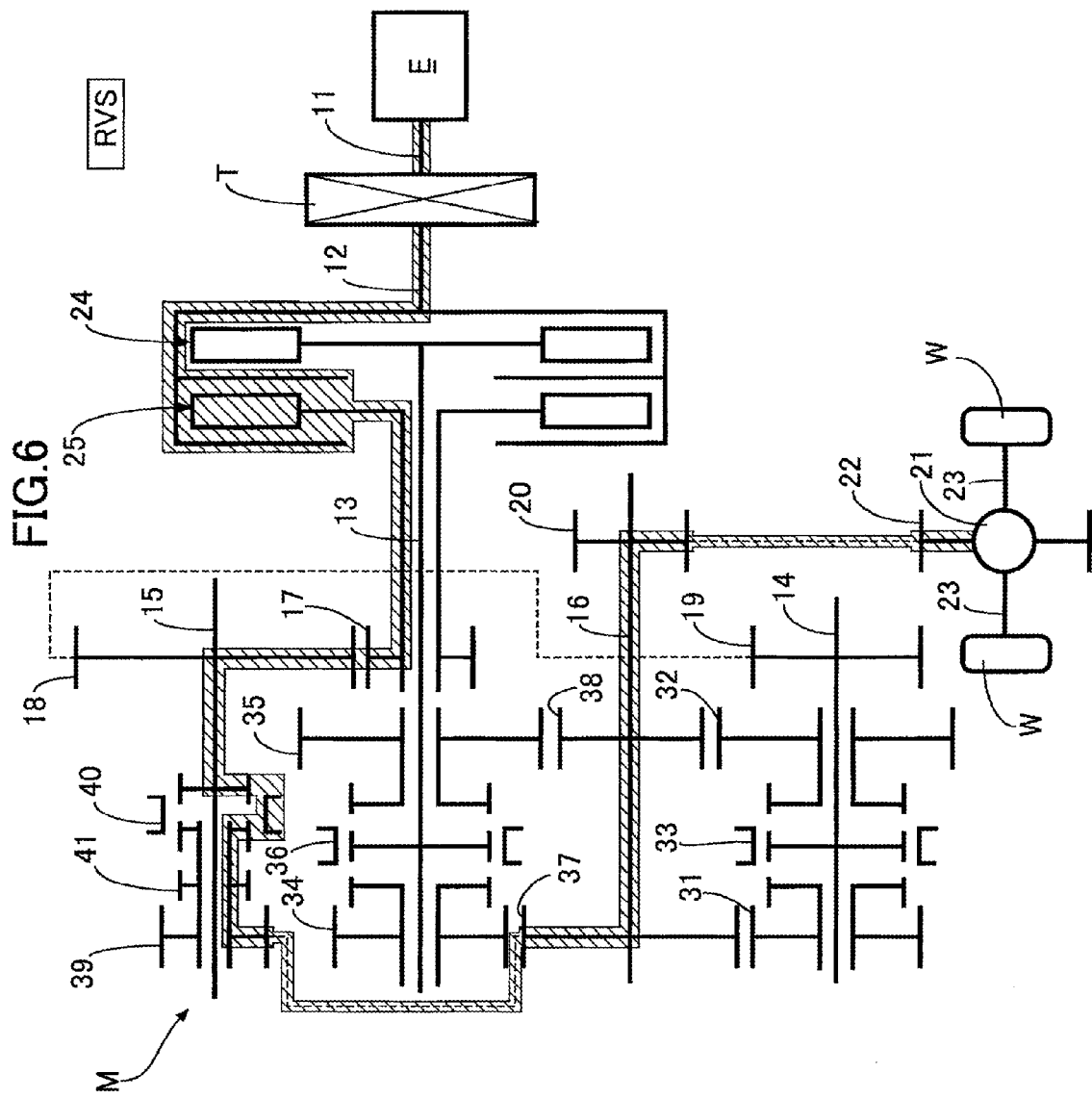
FIG. 6 is a diagram showing a state in which a reverse gear position is established (first embodiment).

As shown in FIG. 6, when establishing the reverse gear position, in a state in which the reverse idle gear 39 is connected to the reverse idle shaft 15 by the third synchronizing device 40, the second clutch 25 is engaged so as to connect the main input shaft 12 to the idle drive gear 17. In this state, the driving force of the engine E is reversed in rotation and transmitted to the wheels W and W via the path: torque converter T→main input shaft 12→second clutch 25→idle drive gear 17→idle gear 18→reverse idle shaft 15→third synchronizing device 40→reverse idle gear 39→first speed—second speed—reverse driven gear 37→output shaft 16→final drive gear 20→final driven gear 22→differential gear 21→drive shafts 23 and 23.

A parking lock mechanism is now explained by reference to FIG. 7 to FIG. 10.

In the vicinity of the parking gear 41 fixedly provided on the reverse idle gear 39, a parking pawl 43 is swingably supported on a housing (not illustrated) via a support shaft 42. The parking pawl 43 is a Y-shaped member; its base end is pivotably supported on the support shaft 42, an engagement claw 43a that can engage with a tooth groove 41a of the parking gear 41 is formed at one extremity, and a portion to be pressed 43b is formed at the other extremity.

A shift rod 44 disposed in parallel to the reverse idle shaft 15 can stop selectively in a stepped manner at three positions, that is, a neutral position, a reverse position, and a parking position, while a shift piece 45 integral with the shift rod 44 is connected to an actuator 46 and moves in a direction parallel to the reverse idle shaft 15. To accomplish this, three detent grooves 44a, 44b, and 44c are formed in the shift rod 44; the neutral position is achieved when a detent ball 47 urged by a spring, which is not illustrated, engages with the detent groove 44b (see FIG. 7), the reverse position is achieved when the detent ball 47 engages with the detent groove 44a (see FIG. 8), and the parking position is achieved when the detent ball 47 engages with the detent groove 44c (see FIG. 9).

The shift rod 44 is provided integrally with a shift fork 48 for driving a sleeve (not illustrated) of the third synchronizing device 40 (see FIG. 1) and a parking rod support part 49. A parking rod 51 linked to the parking rod support part 49 via a universal joint 50 extends substantially parallel to the shift rod 44, and a cam member 52 slidably fitted onto an intermediate section of the parking rod 51 is urged toward the universal joint 50 side by a coil spring 53 provided in a compressed state between the cam member 52 and an extremity of the parking rod 51. The cam member 52, which includes a uniform diameter portion 52a and a tapered portion 52b, faces the portion to be pressed 43b of the parking pawl 43 and a parking rod holder 54 fixed to the housing (not illustrated) so that it can abut thereagainst. With regard to the parking pawl 43, the engagement claw 43a is urged in a direction in which it moves away from the parking gear 41 by a torsion spring 55 provided on the outer periphery of the support shaft 42.

Figure 7:
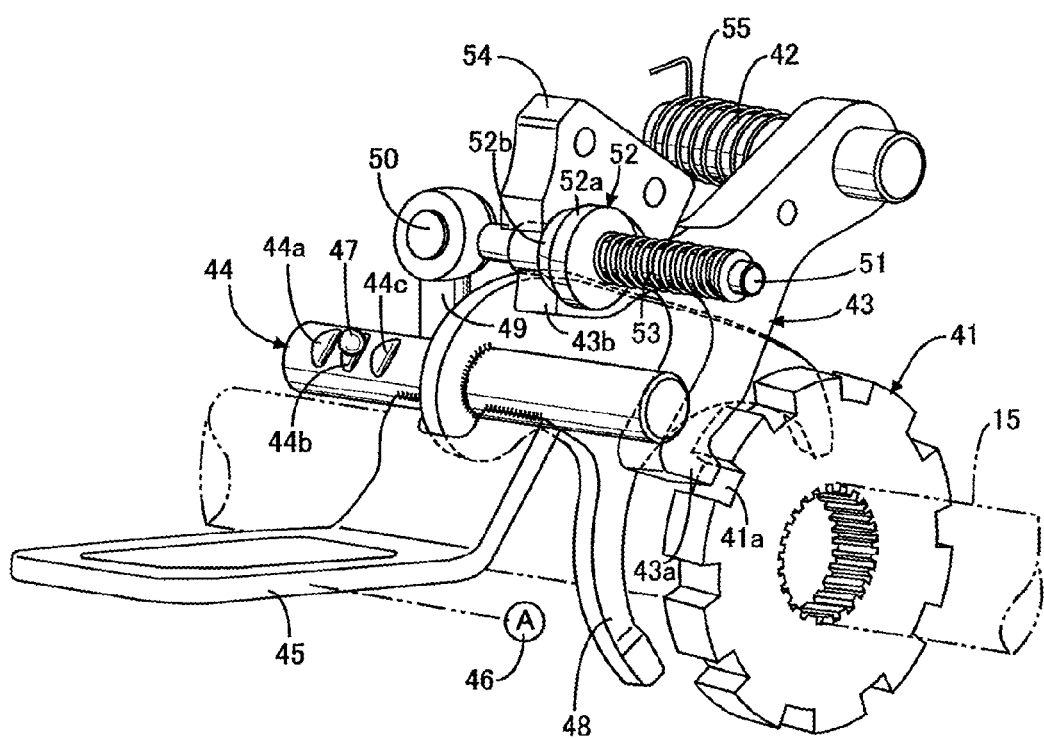
FIG. 7 is a perspective view of a parking lock mechanism (neutral position) (first embodiment).

As shown in FIG. 7, since in the neutral state, in which the detent ball 47 is fitted in the middle detent groove 44b of the shift rod 44, the reverse idle gear 39 (see FIG. 1) is not connected to the reverse idle shaft 15, and the tapered portion 52 of the cam member 52 supported on the parking rod 51 is not in contact with the portion to be pressed 43b of the parking pawl 43, the parking pawl 43 is urged by the torsion spring 55 in the clockwise direction in FIG. 7 around the support shaft 42, and the engagement claw 43a is in a state in which it does not engage with the tooth groove 41a of the parking gear 41.

Figure 8:
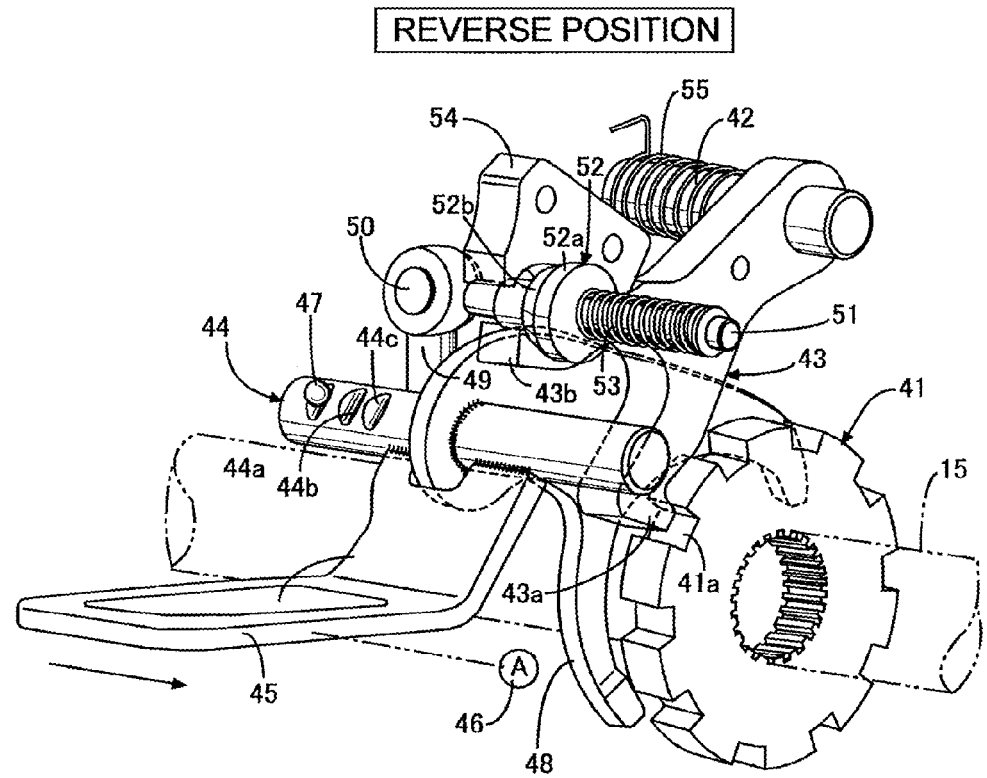
FIG. 8 is a perspective view of the parking lock mechanism (reverse position) (first embodiment).

As shown in FIG. 8, when the shift rod 44 is moved from the neutral position in the rightward direction in the figure by means of the actuator 46 and a state in which the detent ball 47 is fitted in the detent groove 44a of the shift rod 44 is achieved, the shift fork 48 integral with the shift rod 44 moves the sleeve of the third synchronizing device 40 (see FIG. 1), thus establishing a reverse gear position (see FIG. 6). In this process, since the cam member 52 supported on the parking rod 51 moves in a direction in which it moves away from the parking pawl 43, the latching portion 43a of the parking pawl 43 does not engage with the tooth groove 41a of the parking gear 41.

Figure 9:
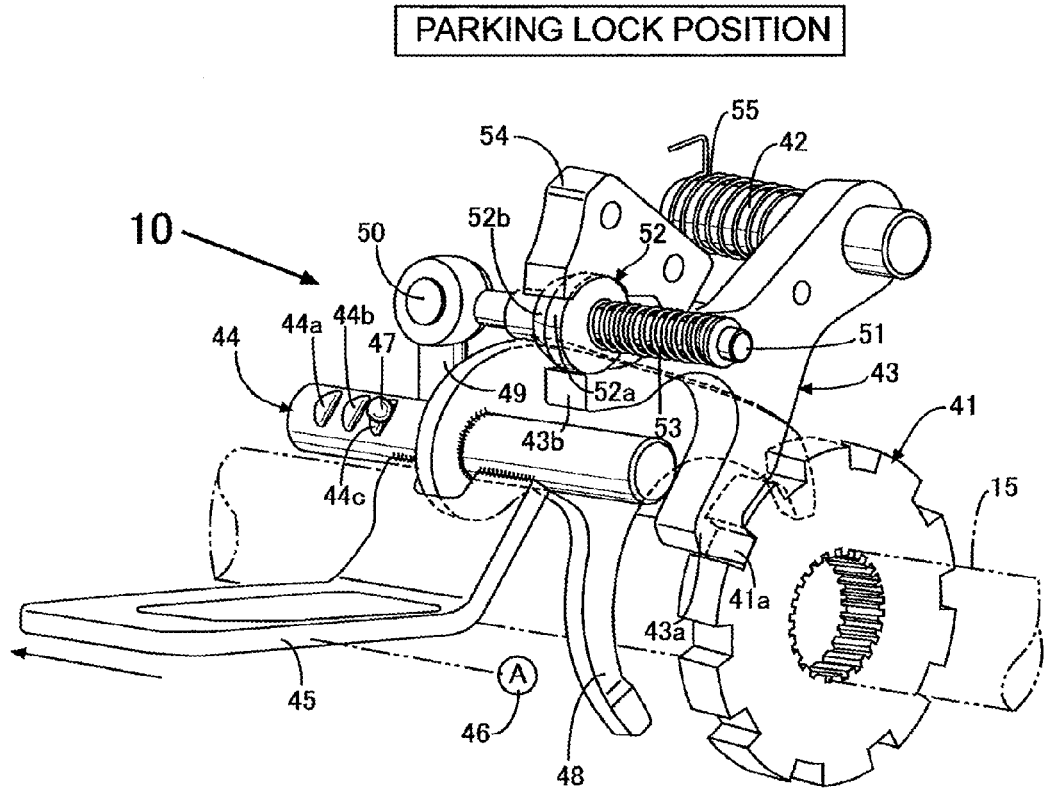
FIG. 9 is a perspective view of the parking lock mechanism (parking position) (first embodiment).
Figure 10:
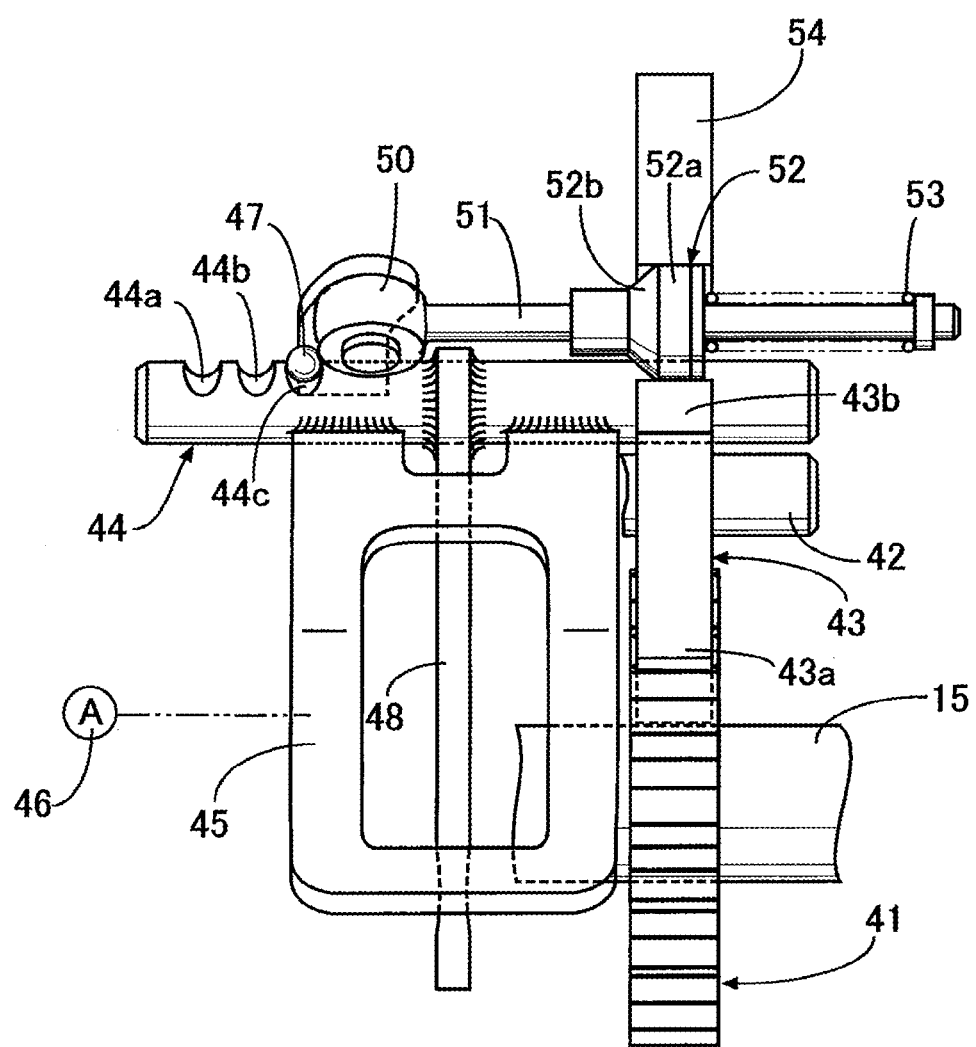
FIG. 10 is a view from an arrowed direction 10 in FIG. 9 (first embodiment).

As shown in FIG. 9 and FIG. 10, when the shift rod 44 is moved from the neutral position in the leftward direction in the figure by means of the actuator 46 and a state in which the detent ball 47 is fitted in the detent groove 44c of the shift rod 44 is achieved, since the shift fork 48 integral with the shift rod 44 moves the sleeve of the third synchronizing device 40 in a direction opposite to that of FIG. 8, a reverse gear position is not established. In this process, since the cam member 52 supported on the parking rod 51 moves in a direction in which it moves closer to the parking pawl 43, its tapered portion 52b is pressed in between the parking rod holder 54 and the portion to be pressed 43b of the parking pawl 43, and the parking pawl 43 is swung in the anticlockwise direction in the figure around the support shaft 42. As a result, the engagement claw 43a of the parking pawl 43 engages with the tooth groove 41a of the parking gear 41, the parking gear 41 is restrained so that it cannot rotate, and the parking lock is operated.

When the phase of the tooth groove 41a of the parking gear 41 is displaced relative to the engagement claw 43a of the parking pawl 43, since the engagement claw 43a cannot engage with the tooth groove 41a, the cam member 52 is held in readiness by sliding relative to the parking rod 51 while compressing the coil spring 53. At the instant the vehicle moves slightly and the phase of the tooth groove 41a of the parking gear 41 coincides with the engagement claw 43a of the parking pawl 43, the cam member 52 moves in the leftward direction in the figure by means of the resilient force of the compressed coil spring 53, thus operating the parking lock.

In a state in which the parking lock is thus operated, the uniform diameter portion 52a of the cam member 52 is sandwiched between the parking rod holder 54 and the portion to be pressed 43b of the parking pawl 43, thus stabilizing the state in which the parking lock is operated.

As hereinbefore described, when the parking lock is operated by engaging the parking pawl 43 with the parking gear 41 provided on the reverse idle shaft 15 of the transmission M, since the parking rod 51 for operating the parking pawl 43 is provided on the shift rod 44 connected to and operated by the actuator 46 in order to establish a reverse gear position for the transmission M, it becomes possible to carry out both establishment of the reverse gear position and operation of the parking lock by using the shift rod 44, and it is possible to reduce the size of the transmission M and cut the cost by enabling the number of components, including the number of actuators, to be cut.

Moreover, since the reverse gear position is established by operating the shift rod 44 in one direction from the neutral position, and the parking lock is operated by operating the shift rod 44 in another direction from the neutral position, it becomes possible to impart to one shift rod 44 both a gear shift function and a parking lock function, thereby further reducing the number of components and contributing to a reduction in the size and weight of the transmission M.

An embodiment of the present invention is explained above, but the present invention may be modified in a variety of ways as long as the modifications do not depart from the spirit and scope thereof.

For example, in the embodiment the twin clutch type transmission M is illustrated, but the present invention may be applied to any type of transmission that is equipped with a meshing type clutch.

Furthermore, in the embodiment the shift rod 44 for establishing the reverse gear position is utilized for operation of the parking lock, but a shift rod for establishing any gear position other than the reverse gear position may be utilized for operation of the parking lock.

Moreover, in the embodiment the parking gear 41 is provided on the reverse idle shaft 15, but the parking gear 41 may be provided on any gear shaft as long as it is always connected to the wheels W and W and is not detached from the wheels W and W. Specifically, the parking gear 41 may be provided, other than on the reverse idle shaft 15 of the embodiment, on the output shaft 16 or the drive shafts 23 and 23 (see dotted broken lines in FIG. 1).

In addition, when the parking gear 41 is provided on the first auxiliary input shaft 13 or the second auxiliary input shaft 14, it is necessary to engage a meshing type clutch in order to ensure a state in which the wheels W and W and the first and second auxiliary input shafts 13 and 14 are linked while the vehicle is stopped, and by so doing it is possible to provide the parking gear 41 on the first and second auxiliary input shafts 13 and 14.

The invention claimed is:

1. A parking lock apparatus for a transmission in which a meshing type clutch provided on a gear shaft of a transmission is operated by a gearshift member that is connected to and operated by an actuator so as to establish a predetermined gear position, comprising:
 the gearshift member,
 a parking gear provided on the gear shaft, the gear shaft being operable in association with a drive shaft when a vehicle is stopped,
 a parking pawl that can engage with the parking gear,
 a parking pawl drive member formed as a parking rod that operates the parking pawl,
 a cam member which is axially slidable on the parking rod,
 a spring which is arranged adjacent to the cam member, for urging the cam member in one axial direction, and
 a joint linking the parking rod to a parking rod support part,
 wherein the parking rod extends parallel to the gearshift member, and
 wherein a groove is formed in the gearshift member and a detent ball is engageable with the groove, for establishing a parking position.

2. The parking lock apparatus in a transmission according to claim 1,
 wherein if the gearshift member is operated in one direction from a neutral position, the predetermined gear position is established, and
 wherein if the gearshift member is operated in another direction from the neutral position, the parking pawl engages with the parking gear.

\* \* \* \* \*